United States Patent
Choi et al.

(10) Patent No.: US 10,153,530 B2
(45) Date of Patent: Dec. 11, 2018

(54) METAL-AIR BATTERY

(71) Applicant: Samsung Electronics Co., Ltd., Suwon-si, Gyeonggi-do (KR)

(72) Inventors: Kyounghwan Choi, Suwon-si (KR); Jungock Park, Suwon-si (KR); Joonhee Kim, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 103 days.

(21) Appl. No.: 15/204,337

(22) Filed: Jul. 7, 2016

(65) Prior Publication Data
US 2017/0104253 A1 Apr. 13, 2017

(30) Foreign Application Priority Data

Oct. 13, 2015 (KR) .................. 10-2015-0143042

(51) Int. Cl.
*H01M 12/08* (2006.01)
*H01M 4/86* (2006.01)
*H01M 8/04* (2016.01)
*H01M 8/04082* (2016.01)

(52) U.S. Cl.
CPC ......... *H01M 12/08* (2013.01); *H01M 4/8626* (2013.01); *H01M 8/04201* (2013.01); *H01M 2004/8689* (2013.01); *Y02E 60/128* (2013.01)

(58) Field of Classification Search
CPC ...... H01M 12/00–12/085; H01M 4/78; H01M 4/8807; H01M 4/74; H01M 4/742; H01M 4/745; H01M 4/747; H01M 4/75; H01M 4/86; H01M 4/8689; H01M 8/0254
See application file for complete search history.

(56) References Cited

U.S. PATENT DOCUMENTS

| 4,746,585 A | 5/1988 | Stoner et al. |
| 4,927,717 A | 5/1990 | Turley et al. |
| 6,010,317 A * | 1/2000 | Maget ............... A61M 5/14526 417/379 |
| 8,871,394 B1 | 10/2014 | Garcia et al. |

(Continued)

FOREIGN PATENT DOCUMENTS

| JP | 2002175818 A | 6/2002 |
| JP | 2005216652 A | 8/2005 |

(Continued)

OTHER PUBLICATIONS

Extended European Search Report for Application No. 16193402.1 dated Dec. 21, 2016.

*Primary Examiner* — Matthew J Merkling
(74) *Attorney, Agent, or Firm* — Cantor Colburn LLP

(57) ABSTRACT

Metal-air batteries include first and second battery stack structures each comprising an anode, an anode electrolyte layer, a cathode, and a gas diffusion layer, and cathode current collectors disposed between the first and second battery stack structures and having a non-flat shape, where the cathodes of the first and second battery stack structures face each other, the cathode current collectors contact the gas diffusion layers of the first and second battery stack structures, at least one of the cathode current collectors includes protrusions, and an empty space between the cathode current collector and the first and second battery stack structures is an air supply unit to supply air to the gas diffusion layer.

16 Claims, 13 Drawing Sheets

(56) References Cited

U.S. PATENT DOCUMENTS

| | | | |
|---|---|---|---|
| 9,509,027 B2* | 11/2016 | Park | H01M 12/06 |
| 2002/0086196 A1 | 7/2002 | Utsunomiya et al. | |
| 2008/0118814 A1 | 5/2008 | Lee et al. | |
| 2008/0268327 A1* | 10/2008 | Gordon | H01M 2/1646 |
| | | | 429/50 |
| 2009/0053571 A1* | 2/2009 | Takata | H01M 8/0206 |
| | | | 429/434 |
| 2009/0169939 A1* | 7/2009 | Devries | H01M 8/0267 |
| | | | 429/423 |
| 2010/0330411 A1 | 12/2010 | Nam et al. | |
| 2011/0117456 A1* | 5/2011 | Kim | H01M 2/162 |
| | | | 429/406 |
| 2013/0157152 A1 | 6/2013 | Lanning et al. | |
| 2013/0209899 A1 | 8/2013 | Suzuki | |
| 2013/0216921 A1 | 8/2013 | Maloney et al. | |
| 2015/0079485 A1 | 3/2015 | Choi et al. | |
| 2015/0086882 A1* | 3/2015 | Tsukada | H01M 2/024 |
| | | | 429/405 |
| 2015/0086883 A1* | 3/2015 | Tsukada | B29C 41/46 |
| | | | 429/405 |
| 2015/0099198 A1* | 4/2015 | Tsukada | H01M 12/08 |
| | | | 429/407 |
| 2015/0140452 A1 | 5/2015 | Park et al. | |
| 2015/0207168 A1 | 7/2015 | Do et al. | |

FOREIGN PATENT DOCUMENTS

| | | | |
|---|---|---|---|
| JP | 2015106486 A | 6/2015 | |
| KR | 100829553 B1 | 5/2008 | |
| KR | 20120033661 A | 4/2012 | |
| KR | 101146616 B1 | 5/2012 | |
| KR | 1020130131791 A | 12/2013 | |

\* cited by examiner

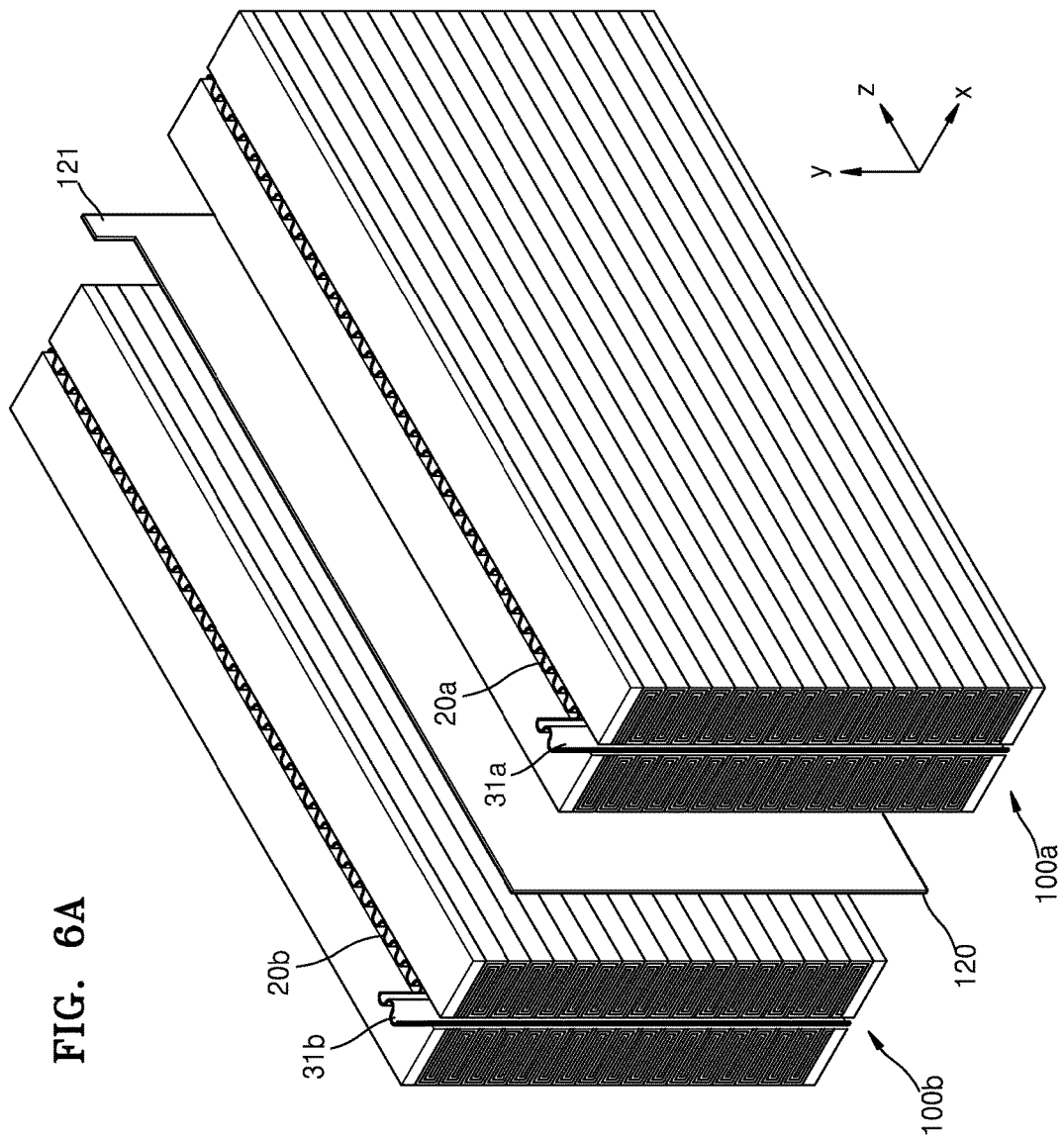

METAL-AIR BATTERY

CROSS-REFERENCE TO RELATED APPLICATION

This application claims priority to Korean Patent Application No. 10-2015-0143042, filed on Oct. 13, 2015, and all the benefits accruing therefrom under 35 U.S.C. § 119, the content of which in its entirety is herein incorporated by reference.

BACKGROUND

1. Field

Exemplary embodiments of the invention relate to metal-air batteries, and more particularly, to metal-air batteries that include a cathode sharing type current collector.

2. Description of the Related Art

A metal-air battery includes an anode that may intercalate/de-intercalate metal ions, such as lithium ions, a cathode that may oxidize or reduce oxygen in the air, and a metal ion conductive medium interposed between the anode and the cathode.

In a discharge process of the metal-air battery, a metal oxide is generated from a reaction between metal ions emitted from an anode and air (e.g., oxygen), and in a charge process, the generated metal oxide is reduced to metal ions and air, and thus, the metal-air battery may be repeatedly charged and discharged. Since oxygen that is a cathode active material is obtained from the air, the cathode active material does not need to be stored in the metal-air battery. Thus, theoretically, the metal-air battery may realize a large capacity greater than that of a secondary battery that uses a solid cathode active material.

The metal-air battery may have a very high energy density because the metal-air battery uses air as a cathode active material, and thus, the metal-air battery is receiving much attention as a next generation battery.

SUMMARY

Provided are metal-air batteries having a battery stack structure in which air is smoothly supplied to a cathode.

Provided are metal-air battery apparatuses having a high capacity with a small volume without any loss of space of the metal-air battery apparatuses by continuously connecting unit modules of the metal-air batteries.

Additional exemplary embodiments will be set forth in part in the description which follows and, in part, will be apparent from the description, or may be learned by practice of the presented exemplary embodiments.

According to an exemplary embodiment of an exemplary embodiment, a metal-air battery includes first and second battery stack structures each comprising an anode, an anode electrolyte layer, a cathode, and a gas diffusion layer, and cathode current collectors disposed between the first and second battery stack structures and having a non-flat shape, where the cathodes of the first and second battery stack structures face each other.

In an exemplary embodiment, the cathode current collectors may further include first protrusions contacting the gas diffusion layer of the first battery stack structure by protruding in a direction towards the gas diffusion layer of the first battery stack structure.

In an exemplary embodiment, the metal-air battery may further include a first air supply unit disposed between the first battery stack structure and cathode current collectors.

In an exemplary embodiment, the cathode current collectors may further include second protrusions contacting the gas diffusion layer of the second battery stack structure by protruding in a direction towards the gas diffusion layer of the second battery stack structure.

In an exemplary embodiment, the metal-air battery may further include a second air supply unit disposed between the second battery stack structure and the cathode current collectors.

In an exemplary embodiment, at least one hole may be defined through the cathode current collectors.

In an exemplary embodiment, a cross-section of each cathode current collector may have one of a wave shape, a rectangular shape, and a trapezoidal shape.

In an exemplary embodiment, the first battery stack structure and the second battery stack structure may each have a bent structure by stacking the anode, the anode electrolyte layer, the cathode, and the gas diffusion layer, where the cathode is separated from a first surface and contacts second and third surfaces of the gas diffusion layer.

In an exemplary embodiment, the cathode may contact a fourth surface of the gas diffusion layer.

In an exemplary embodiment, the second and third surfaces of the gas diffusion layer may have a relatively larger area than that of the first surface.

According to an exemplary embodiment of another exemplary embodiment, a metal-air battery includes a cathode current collector having a non-flat shape, and first and second battery stack structures respectively disposed on both opposite sides of the cathode current collector, where the cathode current collector contacts gas diffusion layers of the first and second battery stack structures.

According to an exemplary embodiment of an exemplary embodiment, a metal-air battery apparatus includes a plurality of consecutively stacked metal-air battery unit structures, where each of the metal-air battery unit structure includes first and second battery stack structures each including a cathode and a gas diffusion layer and a cathode current collector disposed between the first and second battery stack structures and having a non-flat shape, and the cathodes of the first and second battery stack structures face each other, and anode current collectors disposed between each of the metal-air battery unit structures.

The metal-air battery may further include a cathode tap that protrude from the cathode current collector, and an anode tap that protrude from the anode current collector, where the cathode tap and the anode taps are disposed on different regions from each other.

BRIEF DESCRIPTION OF THE DRAWINGS

These and/or other exemplary embodiments will become apparent and more readily appreciated from the following description of the exemplary embodiments, taken in conjunction with the accompanying drawings in which:

FIG. 6A is an exploded perspective view illustrating an exemplary embodiment of a structure in which an anode current collector is disposed between metal-air batteries;

DETAILED DESCRIPTION

Figure 1:
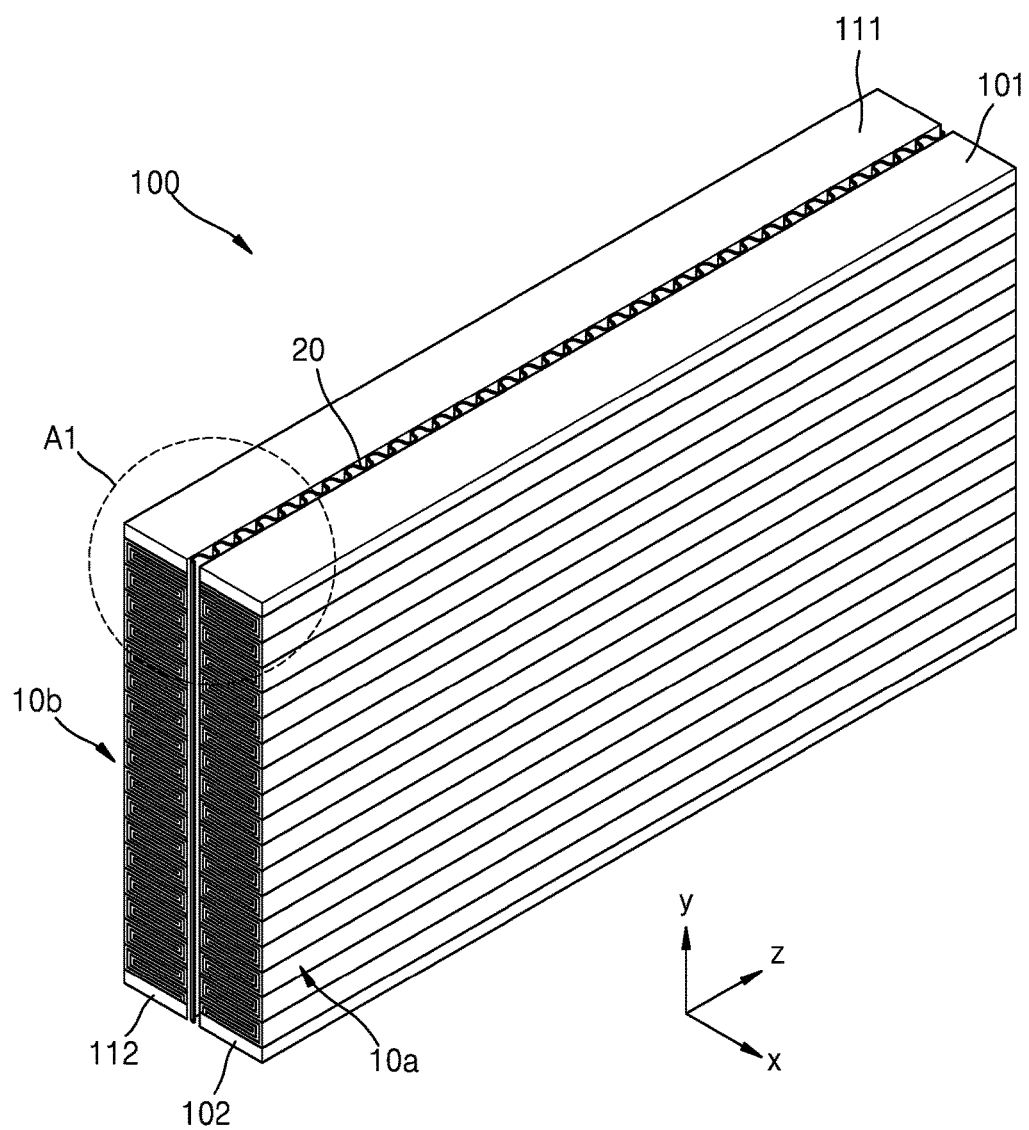
FIG. 1 is a perspective view of an exemplary embodiment of a metal-air battery.

A metal-air battery according to an exemplary embodiment will now be described in detail with reference to accompanying drawings. In the drawings, like reference numerals in the drawings denote like elements, and the sizes of each constituent elements may be exaggerated for convenience of explanation or clarity.

The exemplary embodiments of the invention are capable of various modifications and may be embodied in many different forms. It will be understood that when an element or layer is referred to as being "on" or "above" another element or layer, the element or layer may be directly on another element or layer or intervening elements or layers.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. In an exemplary embodiment, when the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, when the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. In an exemplary embodiment, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

FIG. 1 is a perspective view of a metal-air battery 100 according to an exemplary embodiment.

Referring to FIG. 1, the metal-air battery 100 according to the illustrated exemplary embodiment includes a first battery stack structure 10a, a second battery stack structure 10b, and a cathode current collector 20 disposed therebetween. The cathode current collector 20 may be shared to both the first battery stack structure 10a and the second battery stack structure 10b, and both opposite surfaces of the cathode current collector 20 may respectively contact the first battery stack structure 10a and the second battery stack structure 10b. The first battery stack structure 10a and the second battery stack structure 10b are both battery cells, and the metal-air battery 100 according to the illustrated exemplary embodiment is in a type in which a pair of battery cells shares the cathode current collector 20.

Figure 2A:
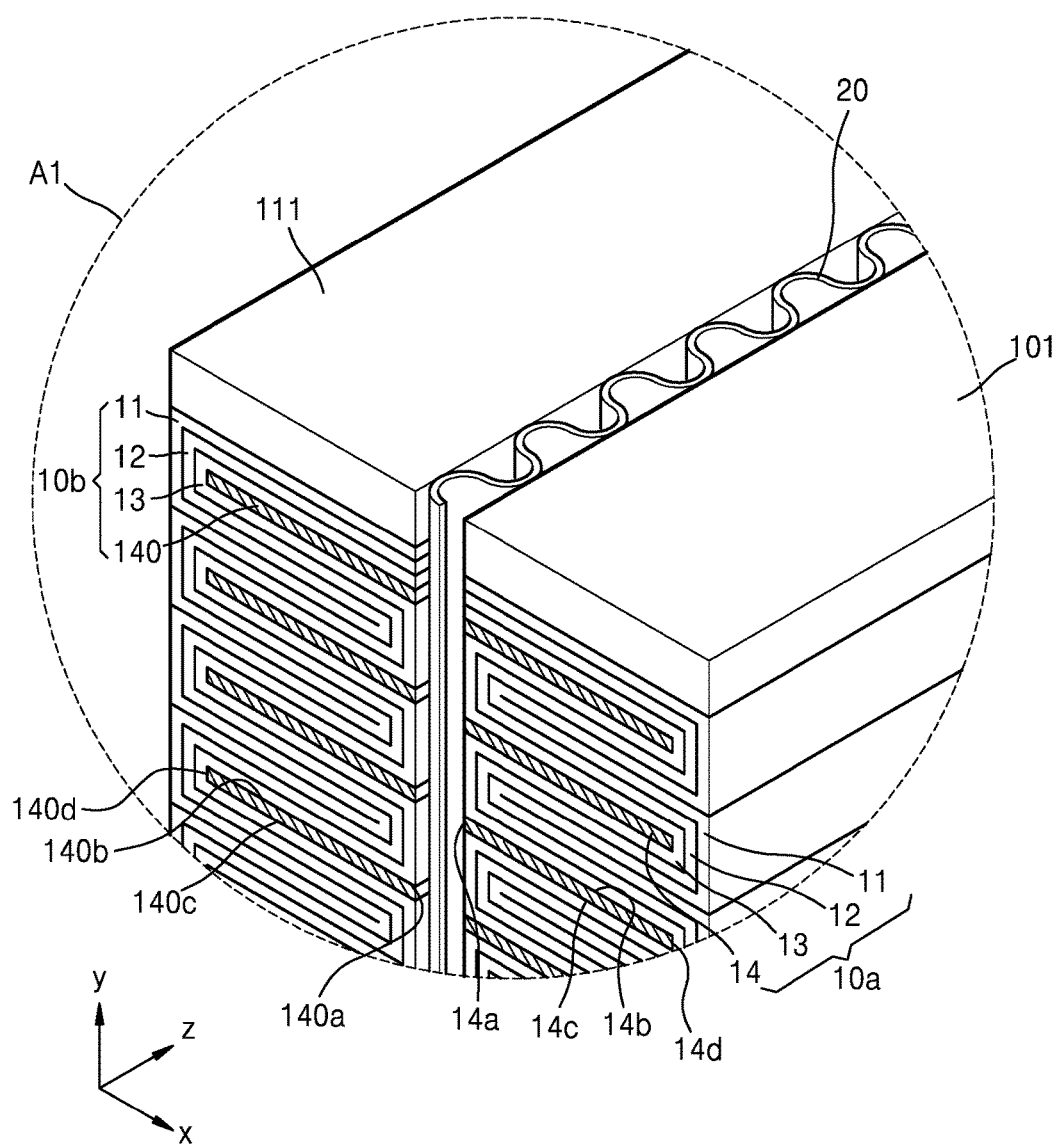
FIG. 2A is a magnified view of a region A1 of FIG. 1.
Figure 2B:
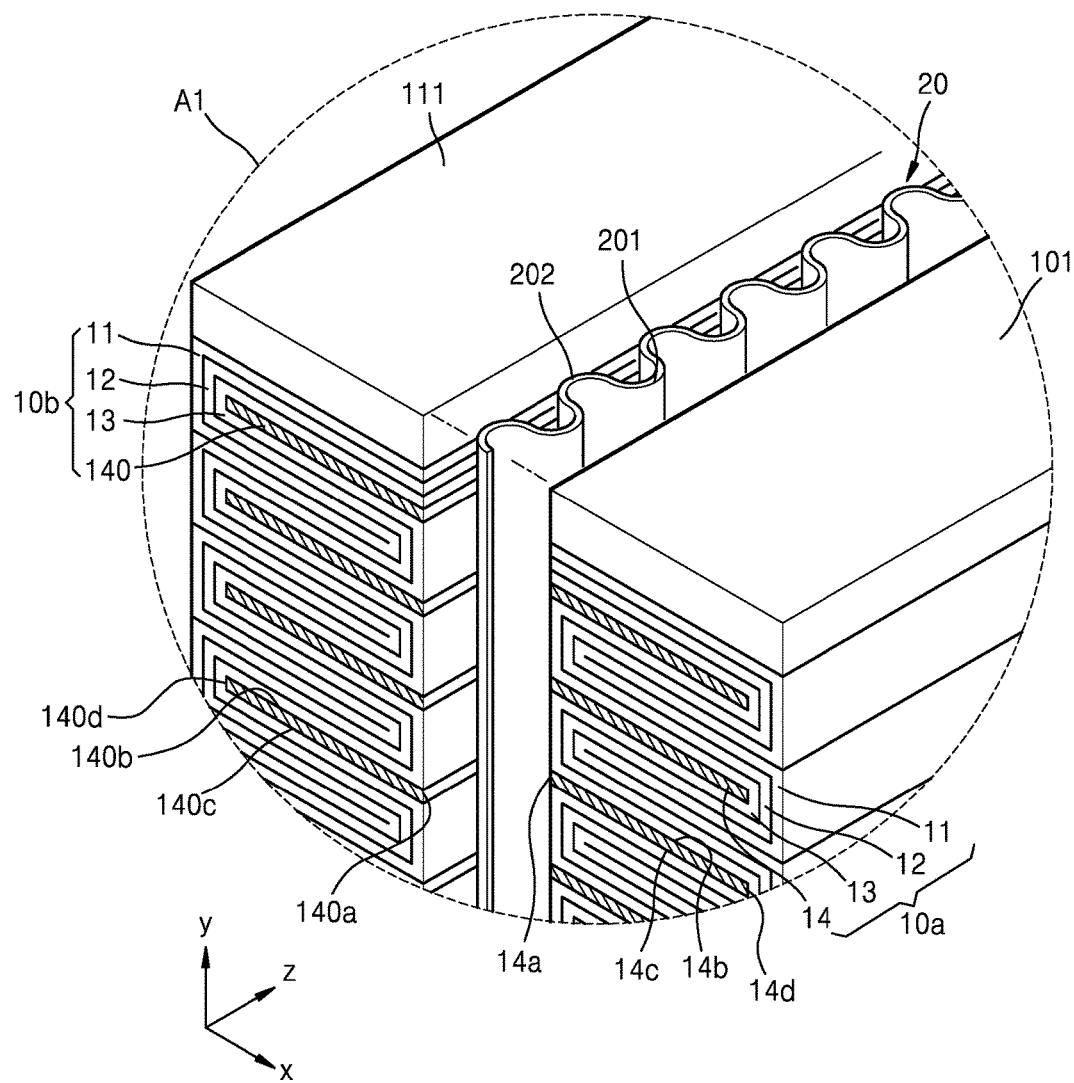
FIG. 2B is a magnified view of the region A1 of FIG. 1.

FIG. 2A is a magnified view of a region A1 of FIG. 1, and FIG. 2B is a magnified view of the region A1 of FIG. 1.

Referring to FIGS. 2A and 2B, the first battery stack structure 10a has a structure in which an anode 11, an anode electrolyte layer 12, a cathode 13, and a gas diffusion layer 14 are stacked. The second battery stack structure 10b has a structure in which an anode 11, an anode electrolyte layer 12, a cathode 13, and a gas diffusion layer 140 are stacked.

The gas diffusion layers 14 and 140 may contact the cathode 13. However, the anode 11, the anode electrolyte layer 12, and the cathode 13 of the first battery stack structure 10a may have a bent-form so that the cathode 13 contacts a second surface 14b and a third surface 14c of the gas diffusion layer 14 and does not contact a first surface 14a of the gas diffusion layer 14. Also, the anode 11, the anode electrolyte layer 12, and the cathode 13 of the second battery stack structure 10b may have a bent-form so that the cathode 13 contacts a second surface 140b and a third surface 140c of the gas diffusion layer 140 and does not contact a first surface 140a of the gas diffusion layer 140. Each of the anode 11, the anode electrolyte layer 12, and the cathode 13 of the first battery stack structure 10a and the second battery stack structure 10b may be consecutively bent to have a zigzag shape.

A fourth surface 14d of the gas diffusion layer 14 of the first battery stack structure 10a may or may not contact the cathode 13. Also, a fourth surface 140d of the gas diffusion layer 140 of the second battery stack structure 10b may or may not contact the cathode 13. The first surface 14a and 140a of the gas diffusion layers 14 and 140 of the first and second battery stack structures 10a and 10b respectively may not contact the cathode 13, and may be exposed to outside of the first and second battery stack structures 10a and 10b.

The gas diffusion layers 14 and 140 of the first and second battery stack structures 10a and 10b may each have thin panel shapes, and the second surfaces 14b and 140b and the third surfaces 14c and 140c of the gas diffusion layers 14 and 140 may be surfaces having a relatively wide area. The first surfaces 14a and 140a have relatively small area when compared to the second surfaces 14b and 140b and the third surfaces 14c and 140c. The second surfaces 14b and 140b of the gas diffusion layers 14 and 140 of the first and second battery stack structures 10a and 10b may be upper surfaces, and the third surfaces 14c and 140c may be lower surfaces. The first surfaces 14a and 140a and the fourth surfaces 14d and 140d of the gas diffusion layers 14 and 140 may be side surfaces of the gas diffusion layers 14 and 140.

The gas diffusion layer 14 of the first battery stack structure 10a and the gas diffusion layer 140 of the second battery stack structure 10b may be spaced apart and face each other. That is, the first surface 14a of the gas diffusion layer 14 of the first battery stack structure 10a and the first surface 140a of the gas diffusion layer 140 of the second battery stack structure 10b may face each other. Also, the cathodes 13 of the first and second battery stack structures 10a and 10b may face each other.

The cathode current collector 20 is disposed (e.g., inserted) between the first and second battery stack structures 10a and 10b of the metal-air battery 100, and may respectively contact the first surface 14a of the first battery stack structure 10a and the first surface 140a of the second battery stack structure 10b.

Referring to FIGS. 1, 2A, and 2B, cover layers 101, 102, 111, and 112 for sealing or protecting the first and second battery stack structures 10a and 10b may be disposed on upper and lower sides of the metal-air battery 100, and for convenience of explanation, covers are not disposed on sides of the metal-air battery 100. The cover layers 101, 102, 111, and 112 may include a material having non-conductivity and having low reactivity with a material in the first and second battery stack structures 10a and 10b.

Figure 3:
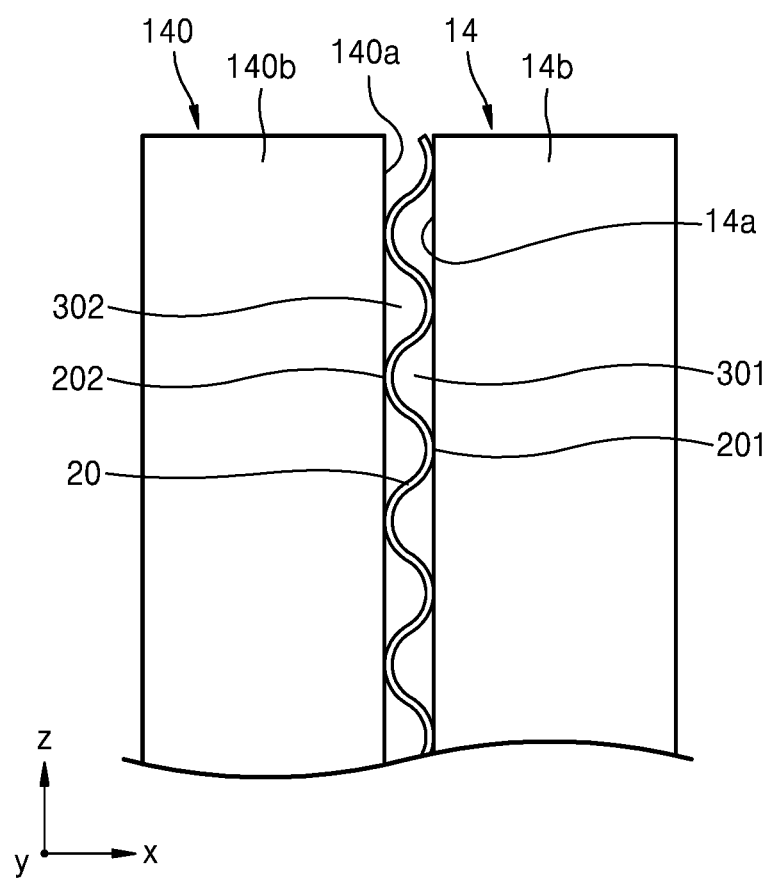
FIG. 3 is a cross-sectional view illustrating an exemplary embodiment of the location relationship between gas diffusion layers and a cathode current collector of a metal-air battery.

FIG. 3 is a cross-sectional view illustrating the location relationship between the gas diffusion layers 14 and 140 and the cathode current collector 20 of the metal-air battery 100 according to an exemplary embodiment. Here, the location relationship between the gas diffusion layers 14 and 140 on an x-z surface and the cathode current collector 20 is shown.

The cathode current collector 20 may have a non-flat shape having some protrusions on certain portions. Here, the non-flat shape may denote a shape in which protrusions that relatively protrude than surrounding areas and recesses between the protrusions are included. Also, the non-flat shape may denote a shape in which first protrusions and second protrusions that protrude in different direction are included. At least one first protrusion 201 that directly contacts the gas diffusion layer 14 of the first battery stack structure 10a (refer to FIGS. 1 to 2B) may be disposed on the cathode current collector 20, and at least one second protrusion 202 that directly contacts the gas diffusion layer 140 of the second battery stack structure 10b (refer to FIGS. 1 to 2B) may be disposed on the cathode current collector 20.

The at least one first protrusion 201 and the at least one second protrusion 202 may be regions protruded in opposite directions. In an exemplary embodiment, the at least one first protrusion unit 201 may protrude downwards, and the at least one second protrusion unit 202 may protrude upwards, or the at least one first protrusion 201 may protrude in a right side direction and the at least one second protrusion 202 may protrude in a left side direction, for example. In FIG. 3, the cathode current collector 20 may have a structure in which the at least one first protrusion 201 protrudes in an x-direction, and the at least one second protrusion 202 protrudes in an −x direction.

The at least one first protrusion 201 of the cathode current collector 20 may contact the gas diffusion layer 14 of the first battery stack structure 10a, and the at least one second protrusion 202 may contact the gas diffusion layer 140 of the second battery stack structure 10b. Regions except for the at least one first protrusion 201 and the at least one second protrusion 202 of the cathode current collector 20 may not contact the gas diffusion layers 14 and 140. The regions where the first and second battery stack structures 10a and 10b do not contact the cathode current collector 20 may be paths for supplying external air to the gas diffusion layer 14. A first air supply unit 301 may be provided between the gas diffusion layer 14 and the cathode current collector 20, and a second air supply unit 302 may be provided between the gas diffusion layer 140 and the cathode current collector 20.

Currents may be collected by contacting the at least one first protrusion 201 of the anode current collector 20 with the gas diffusion layer 14 of the first battery stack structure 10a and by contacting the at least one second protrusion 202 with the gas diffusion layer 140 of the second battery stack structure 10b. Air desired for generating an electrochemical reaction of the metal-air battery 100 may be supplied to the gas diffusion layers 14 and 140 through the first air supply unit 301 and the second air supply unit 302. In this way, the cathode current collector 20 may perform current collection and air supply while simultaneously contacting the gas diffusion layer 14 of the first battery stack structure 10a and the gas diffusion layer 140 of the second battery stack structure 10b. Also, heat generated in the metal-air battery 100 may be readily dissipated to the outside.

Figure 4A:
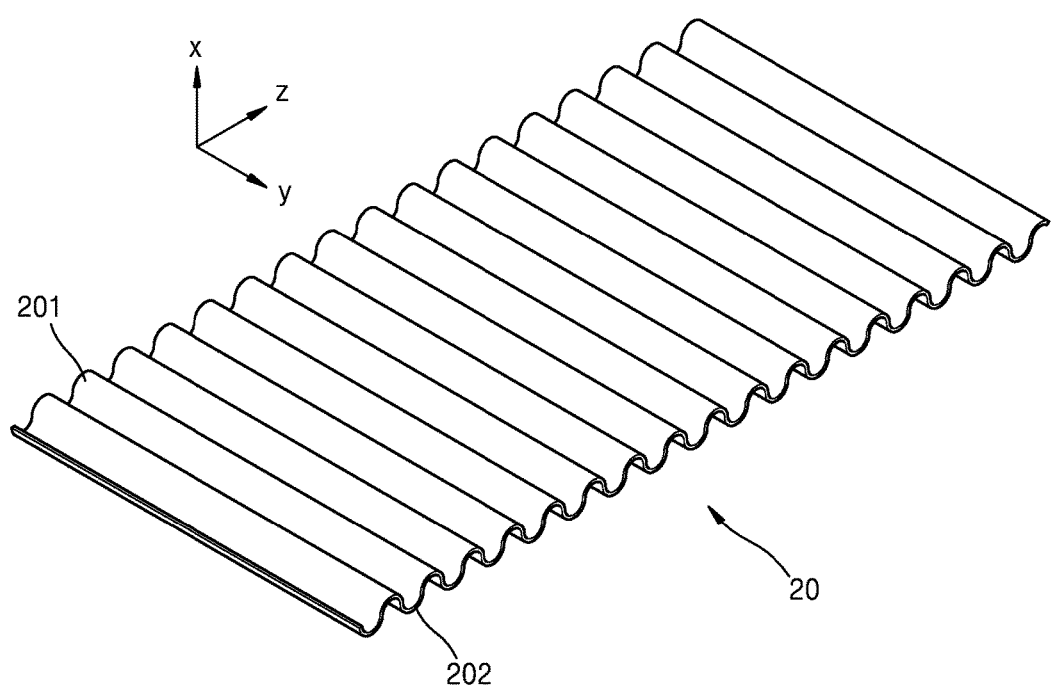
FIGS. 4A through 4C are perspective views illustrating exemplary embodiments of a cathode current collector of a metal-air battery.
Figure 4B:
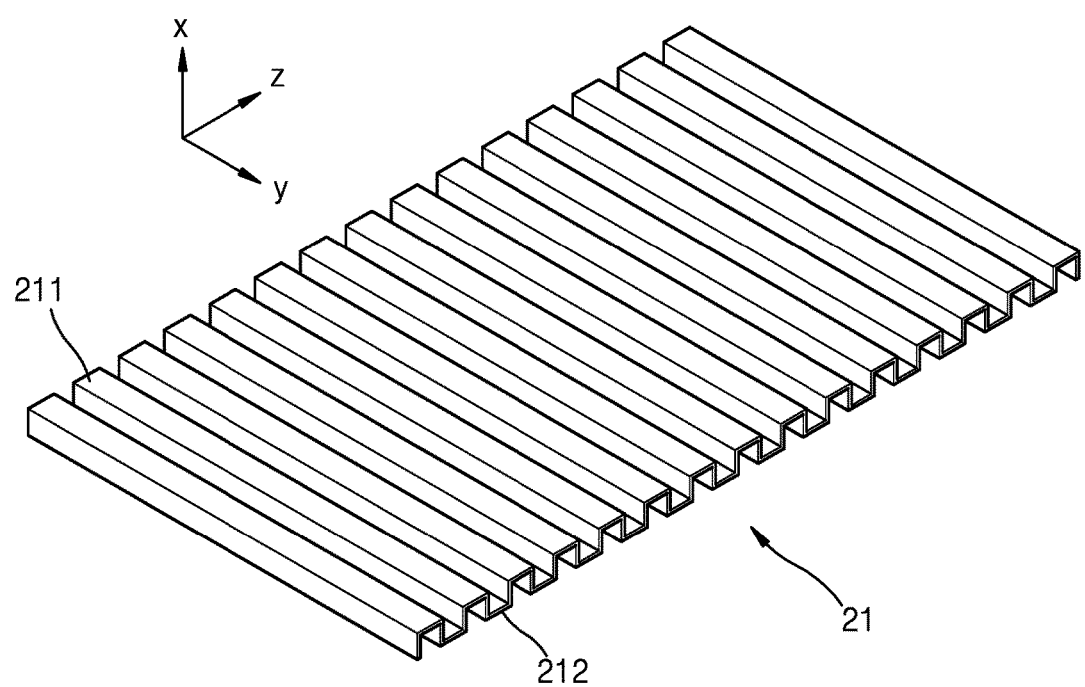
Figure 4C:
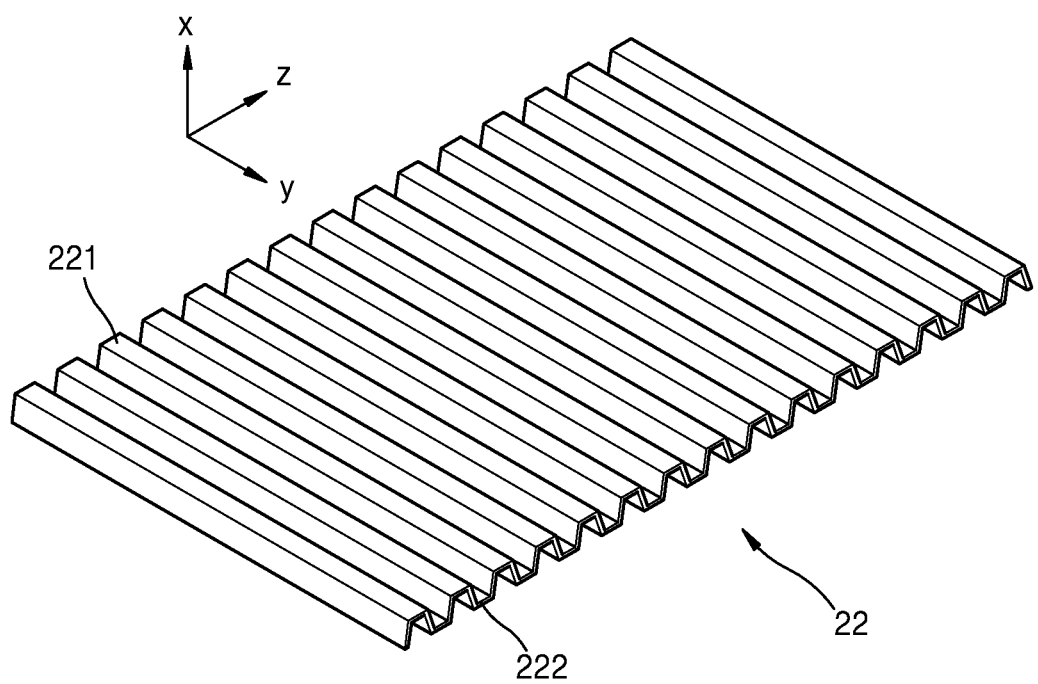

FIGS. 4A through 4C are perspective views illustrating various examples of a cathode current collector of the metal-air battery 100 according to an exemplary embodiment.

Referring to FIG. 4A, the cathode current collector 20 may be provided as a non-flat shape, and may include a plurality of the first protrusions 201 that protrude upwards and a plurality of the second protrusions 202 that protrude downwards between the first protrusions 201. As described above, the cathode current collector 20 is installed to collect a current through contacting between the first protrusions 201 and the second protrusions 202 and the gas diffusion layers 14 and 140 of the first battery stack structure 10a and the second battery stack structure 10b.

In the cathode current collector 20 depicted in FIG. 4A, as an example, a cross-section of the cathode current collector 20 taken in a z-direction includes the first protrusions 201 and the second protrusions 202 having a wave shape with a predetermined curvature, but the illustrated exemplary embodiment is not limited thereto. Referring to FIG. 4B, a cathode current collector 21 may be provided such that a cross-section of first protrusions 211 and second protrusions 212 of the cathode current collector 21 may have a rectangular shape. Also, as depicted in FIG. 4C, a cathode current collector 22 may be provided such that a cross-section of first protrusions 221 and second protrusions 222 of the cathode current collector 21 may have a trapezoidal shape. When a contact area between the cathode current collector 20 and the gas diffusion layers 14 and 140 is wide, a contact resistance may be reduced, but air supply may not be easy.

Accordingly, the cathode current collector 20 may be provided as a non-flat shape instead of a simple flat shape, and may include various shapes of protrusions. In FIGS. 4A through 4C, the cathode current collectors 20, 21, and 22 having a wave shape, a rectangular shape, and a trapezoidal shape are depicted. However, these shapes are examples, that is, the shapes of the cathode current collectors 20, 21, and 22 are not limited.

Figure 5:
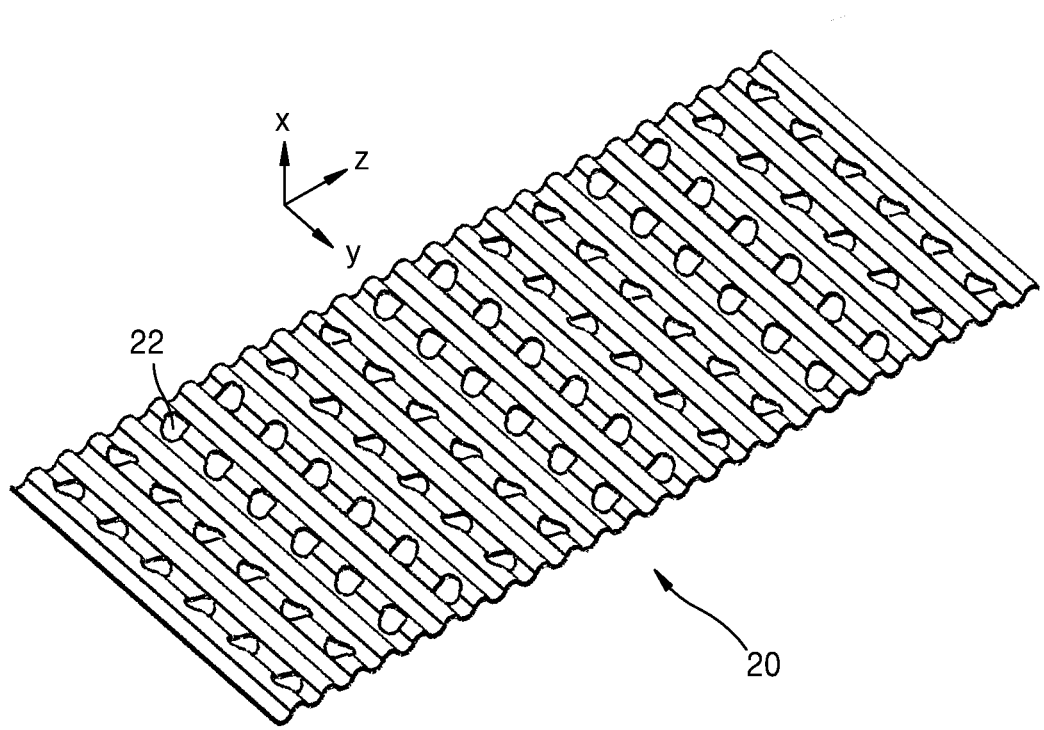
FIG. 5 is perspective view of an exemplary embodiment of a modified version of a cathode current collector of a metal-air battery.

FIG. 5 is perspective view of a modified version of a cathode current collector of the metal-air battery 100 according to an exemplary embodiment.

Referring to FIGS. 4A and 5, at least one hole 22 that passes through both opposite sides of the cathode current collector 20 may be defined. In an exemplary embodiment, the cathode current collector 20 may include a material, such as, a metal having relatively high electrical conductivity, more than two kinds of metals, an alloy, conductive oxide, conductive polymer, or carbon, for example. When the cathode current collector 20 includes a relatively heavy material, this may be a reason for increasing a total weight of the metal-air battery 100 that includes the cathode current collector 20. Accordingly, the weight of the cathode current collector 20 may be reduced by defining at least one hole 22 in the cathode current collector 20, and thus, the total weight of the metal-air battery 100 may be reduced.

In the metal-air battery 100 according to an exemplary embodiment, the anode 11 performs intercalation and deintercalation of metal ions, and may include lithium, sodium, zinc, calcium, magnesium, iron, aluminum, a combination of these metals, or an alloy of these metals. The anode 11 (refer to FIGS. 2A and 2B) may include a lithium thin film, and may be provided by including other anode active material besides lithium. The anode 11 may be provided as an alloy, a composite, or a combination by additionally including an anode active material other than lithium. In an exemplary embodiment, the anode active material other than lithium may include at least one material including a metal that may form an alloy with lithium, a transition metal oxide, and a non-transition metal oxide. In an exemplary embodiment, the transition metal oxide may be lithium-titan oxide, vanadium oxide, or lithium-vanadium oxide, etc., for example.

The anode electrolyte layer 12 (refer to FIGS. 2A and 2B) may transfer metal ions to the cathode 13. The anode electrolyte layer 12 may include an electrolyte provided by dissolving a metal salt in a solvent in order to transfer the metal ions to the cathode 13. The electrolyte may be a solid phase that includes a polymer group electrolyte, an inorganic group electrolyte, or a composite electrolyte in which the polymer group electrolyte and the inorganic group electrolyte are mixed. The anode electrolyte layer 12 may be soluble. In an exemplary embodiment, the metal salt may include a lithium salt or may further include other slats, such as, $AlCl_3$, $MgCl_2$, NaCl, KCl, NaBr, KBr, or $CaCl_2$, besides lithium salt, for example. In an exemplary embodiment, the solvent may be any solvent that may dissolve lithium salt and/or metal salt, for example.

The anode electrolyte layer 12 may further include a separator that prevents transmission of oxygen and has conductivity with respect to metal ions. The separator may be a flexible polymer separator. In an exemplary embodiment, the separator may be, for example, a polymer non-woven fabric, such as, a non-woven fabric including a polypropylene material or a non-woven fabric including a polyphenylene sulfide material, or a porous film including an olefin group resin, such as, polyethylene or polypropylene. The separator and the anode electrolyte layer 12 may be provided as separate layers, but may be provided as a single layer by impregnating an electrolyte in pores of the porous separator. In an exemplary embodiment, the anode electrolyte layer 12 may be provided by impregnating an electrolyte provided by mixing polyethylene oxide ("PEO") and lithium bis(trifluoromethane sulfonyl) imide ("LiTFSI") in pores of the porous separator, for example.

The cathode 13 (refer to FIGS. 2A and 2B) uses oxygen in the air as a cathode active material in the metal-air battery 100. The cathode 13 may include a conductive material that may oxidize or reduce oxygen, and there is no specific limitation. In an exemplary embodiment, the cathode 13 may use a carbon group material, such as, graphite, graphene, carbon black, or carbon fiber, for example. Also, the cathode active material may be a conductive material, such as, a metal fiber or a metal mesh, or may use a metal powder, such as, copper powder, silver powder, nickel powder, or aluminum powder. In an exemplary embodiment, an organic conductive material may be used. The conductive materials may be independently used or used in a mixed state.

A catalyst for oxidizing or reducing oxygen may be included in the cathode 13. In an exemplary embodiment, the catalyst may be, for example, a noble metal group catalyst, such as, platinum, gold, silver, palladium, ruthenium, rhodium, or osmium, an oxide group catalyst, such as, manganese oxide, iron oxide, cobalt oxide, or nickel oxide, or an organic metal group catalyst, such as, cobaltphthalocyanine. However, the catalyst according to the illustrated exemplary embodiment is not limited thereto, that is, the catalyst may be any catalyst that may be used for oxidizing/reducing oxygen in the art.

The cathode 13 may additionally include a binder. The binder may include a thermoplastic resin or a thermohardening resin. In an exemplary embodiment, polyethylene, polypropylene, polytetrafluoroethylene ("PTFE"), polyfluorovinylidene ("PVDF"), styrene-butadiene rubber, tetrafluoroethylene-perfluoroalkylvinylether co-polymer, fluorovinylidene-hexafluoropropylene co-polymer, fluorovinylidene-chlorotrifluoroethylene co-polymer, ethylene-tetrafluoroethylene co-polymer, polychlorotrifluoroethylene, fluorovinylidene-pentafluoropropylene co-polymer, propylene-tetrafluoroethylene co-polymer, ethylene-chlorotrifluoroethylene co-polymer, fluorovinylidene-perfluoromethylether-tetrafluoroethylene co-polymer, or ethyleneacrylic acid co-polymer may be independently used or used in a mixed state as a binder, for example. However, the binder according to the illustrated exemplary embodiment is not limited thereto, that is, any binder used as a binder in the art may be used.

The cathode 13 may additionally include an ion conductive polymer electrolyte. In an exemplary embodiment, the ion conductive polymer electrolyte may be at least one of polyethylene oxide ("PEO"), polyvinylalcohol ("PVA"), polyvinyl pyrrolidone ("PVP"), and polyvinylsulfone or a polymer which is a composite of these materials and is doped with lithium, for example. In an exemplary embodiment, the ion conductive polymer electrolyte may be polyethylene oxide doped with a lithium salt, for example. The lithium salt for doping may be the same lithium salt used in the ion conductive polymer electrolyte described above.

The cathode 13 may be provided such that, after mixing a catalyst for oxidizing and reducing oxygen and a binder in a conductive material and adding a solvent, the combination is coated on a region where the cathode 13 is provided and is dried.

The cathode current collector 20 may include any material having high conductivity. In an exemplary embodiment the cathode current collector 20 may include a metal including copper, gold, platinum, silver, nickel, iron, etc., for example, but is not limited thereto. In an exemplary embodiment, the cathode current collector 20 may include a material, for example, a conductive metal oxide, a conductive polymer, or a carbon including material film besides metals. The cathode current collector 20 may be bendable and have elastic force for restoration to the original shape.

Figure 6B:
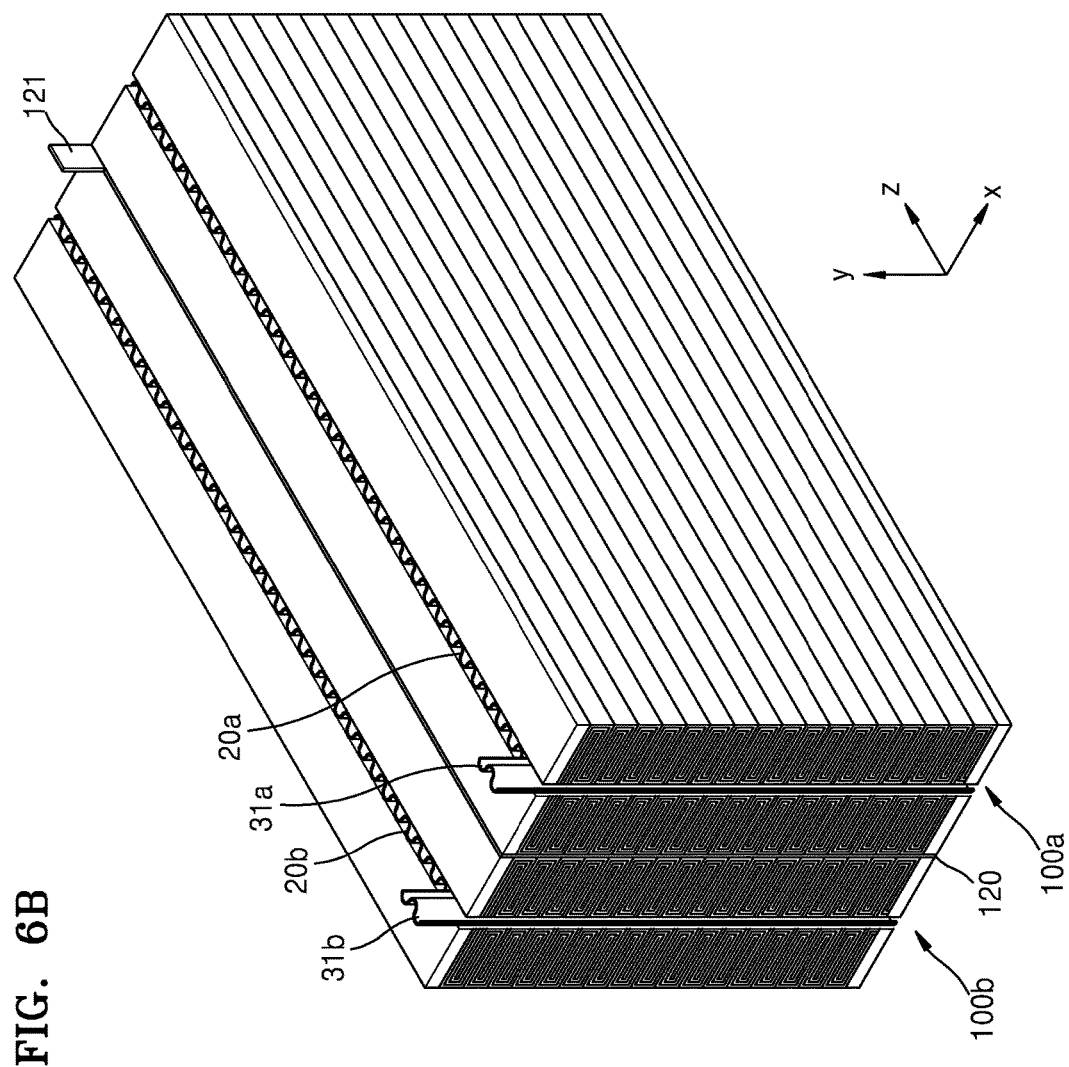
FIG. 6B is a perspective view illustrating a structure in which an anode current collector is combined with the metal-air batteries of FIG. 6A by inserting the anode current collector therebetween.

FIGS. 6A and 6B are perspective views respectively illustrating a structure in which an anode current collector 120 is disposed (e.g., inserted) between metal-air batteries 100a and 100b according to an exemplary embodiment. Here, FIG. 6A is an exploded perspective view illustrating the anode current collector 120 located between the metal-air batteries 100a and 100b, and FIG. 6B is a perspective view illustrating a structure in which the anode current collector 120 is combined to contact the metal-air batteries 100a and 100b.

Referring to FIGS. 1, 2A, 6A, and 6B, external surfaces that include both opposite sides of the metal-air battery 100 have a structure in which the anode 11 is provided. Accordingly, the anode current collector 120 may be disposed (e.g., inserted) between the metal-air batteries 100a and 100b by stacking the metal-air batteries 100a and 100b in a side surface direction (an x-direction or −x-direction). The size of the anode current collector 120 is not specifically limited. However, the anode current collector 120 may have an area similar to that of cathode current collectors 20a and 20b. Also, the shape of the anode current collector 120 is not specifically limited, and thus, may be provided in various types, for example, a flat panel type or a corrugated type.

In an exemplary embodiment, the anode current collector 120 may include an electrically conductive material, such as, a metal. In an exemplary embodiment, the anode current collector 120 may include copper, gold, platinum, silver, nickel, iron, etc., for example, but is not limited thereto. In an exemplary embodiment, the cathode current collector 20 may include a material, for example, a conductive metal oxide, a conductive polymer, or a carbon including material film besides metals.

Cathode taps 31a and 31b that protrude from the cathode current collectors 20a and 20b, respectively, may be disposed on the cathode current collectors 20a and 20b. An anode tap 121 may protrude from the anode current collector 120. The cathode taps 31a and 31b may be respectively disposed on edges of the cathode current collectors 20a and 20b, and may be disposed on similar locations to each other. The anode tap 121 of the anode current collector 120 may be disposed on a different edge from the cathode taps 31a and 31b.

In this manner, since the anode current collector 120 is disposed between anodes of metal-air battery modules and is electrically connected to the anodes, the loss of space of the metal-air battery 100 may be reduced and a metal-air battery having a high capacity with a small volume may be provided. That is, a metal-air battery having a high energy density per volume may be manufactured.

Figure 7:
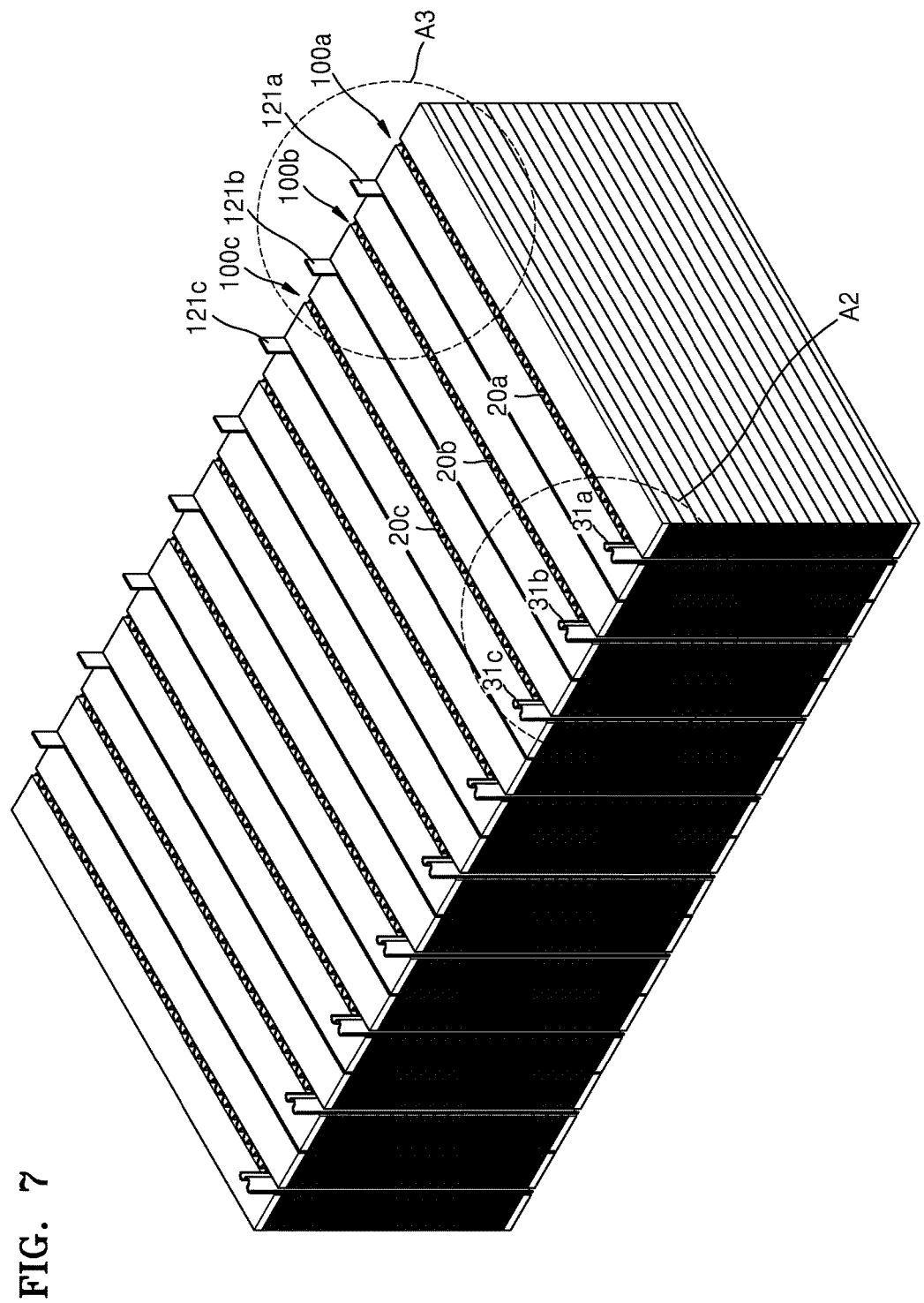
FIG. 7 is a perspective view illustrating an extended structure in which anode current collectors are combined with the metal-air batteries of FIG. 6B by inserting the anode current collectors therebetween.
Figure 8:
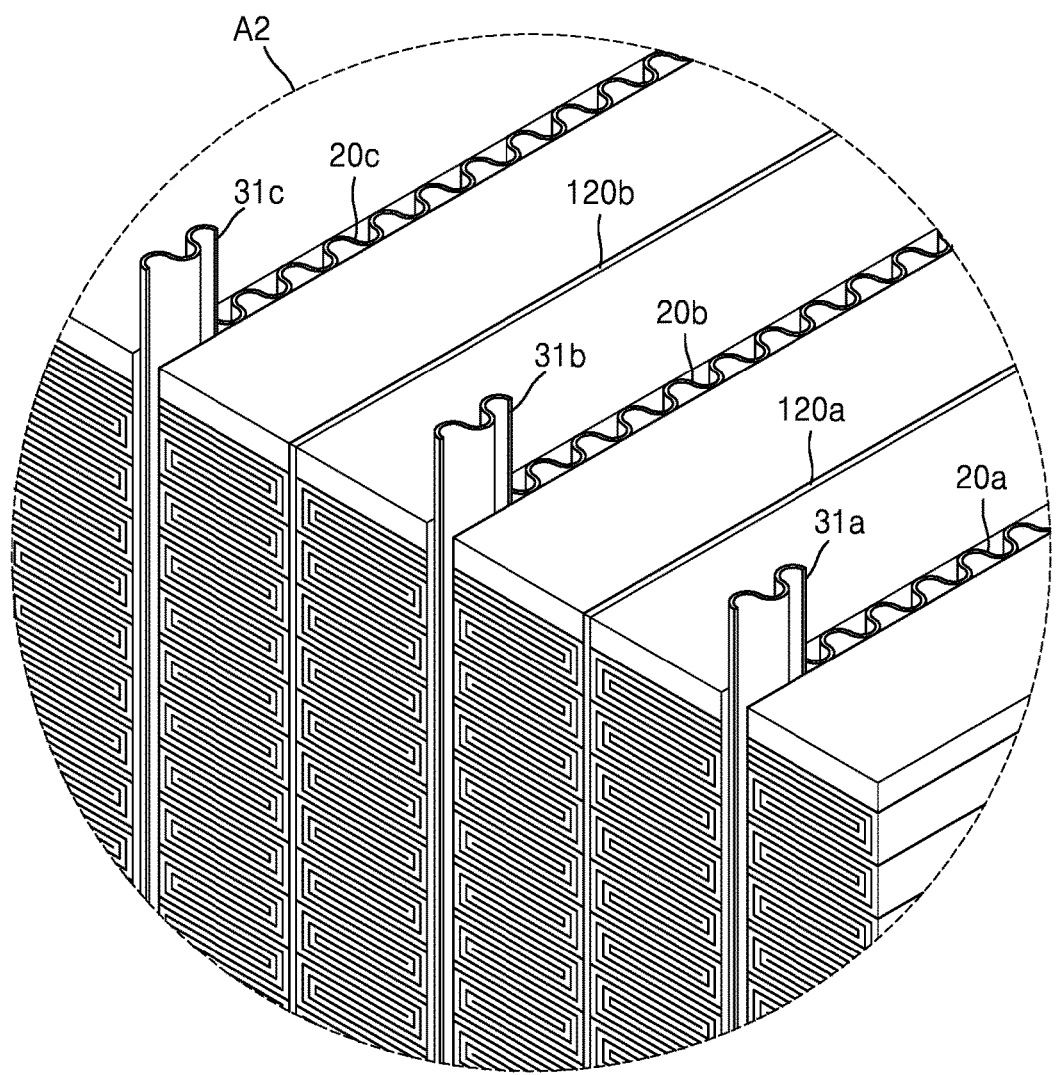
FIG. 8 is a magnified view of a region A2 of FIG. 7.
Figure 9:
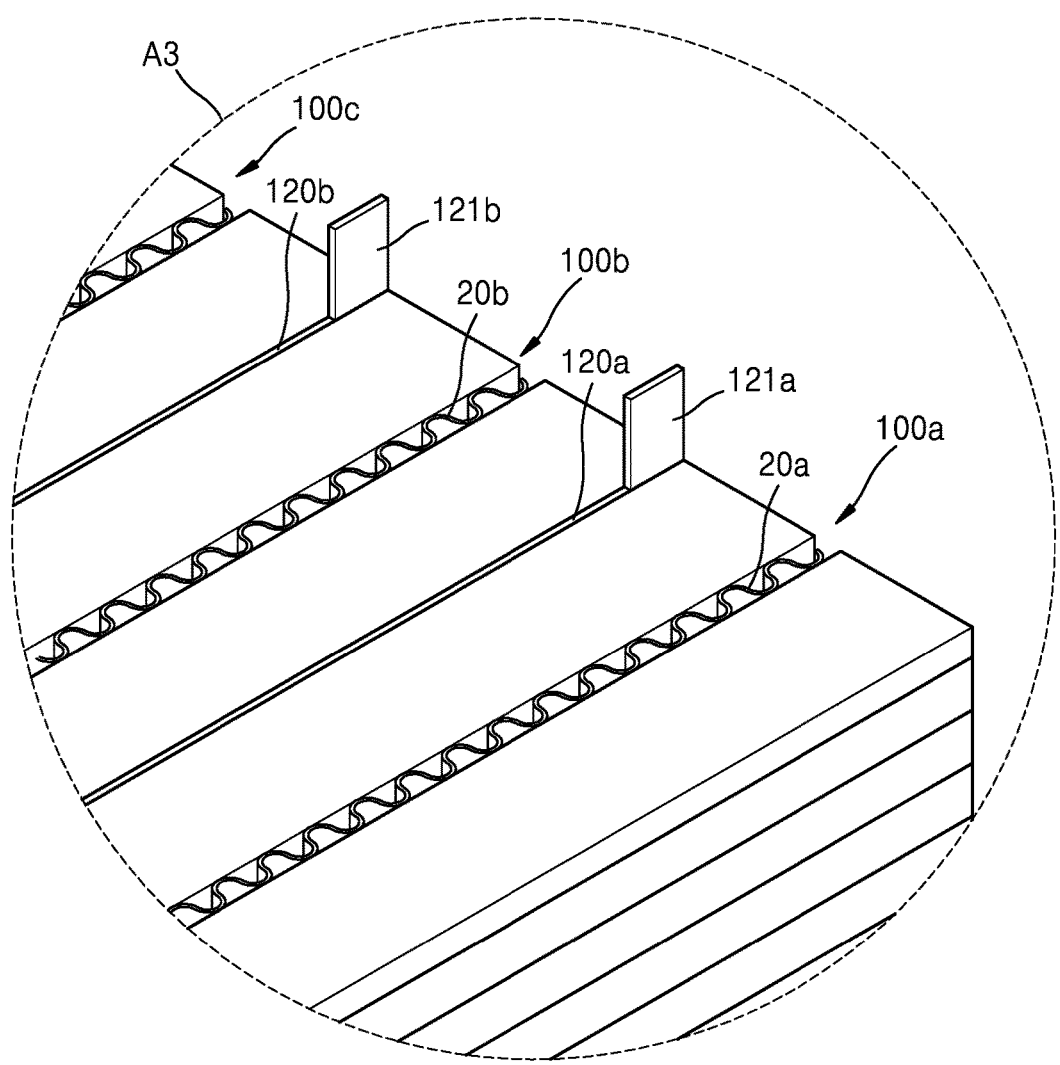
FIG. 9 is a magnified view of a region A3 of FIG. 7.

FIG. 7 is a perspective view illustrating an extended structure in which metal-air battery modules are consecutively combined by inserting an anode current collector between the metal-air batteries of FIG. 6B. FIG. 8 is a magnified view of a region A2 of FIG. 7. FIG. 9 is a magnified view of a region A3 of FIG. 7.

Referring to FIGS. 7 through 9, the stacked metal-air battery is manufactured by inserting anode current collectors 120a, 120b, . . . 120n respectively between a plurality of the metal-air batteries 100a, 100b, 100c, . . . 100n by consecutively stacking the metal-air batteries 100a, 100b, 100c, . . . 100n that respectively include cathode current collectors 20a, 20b, 20c, . . . 20n in a direction. Here, n may be a natural number greater than three. The cathode taps 31a, 31b, . . . 31n may be respectively disposed on edges of the cathode current collectors 20a, 20b, 20c, . . . 20n.

The cathode taps 31a, 31b, . . . 31n may be provided as one body with the cathode current collectors 20a, 20b, 20c, . . . 20n, and may extend from the cathode current collectors 20a, 20b, 20c, . . . 20n with the same shape as the cathode current collectors 20a, 20b, 20c, . . . 20n. Anode taps 121a, 121b, 121c, . . . 121n may be respectively disposed on edges of the anode current collectors 120a, 120b, 121c, . . . 120n. The forming locations of the anode taps 121a, 121b, 121c, . . . 121n may be different from that of the cathode taps 31a, 31b . . . 31n in the metal-air batteries 100a, 100b, 100c, . . . 100n. When the anode taps 121a, 121b, 121c, . . . 121n and the cathode taps 31a, 31b, . . . 31n of the metal-air batteries 100a, 100b, 100c, . . . 100n are connected to each other, the whole stacked metal-air battery may be electrically connected.

If the structure of the metal-air battery 100 of FIG. 1 is referred to as a unit structure of a metal-air battery, the stacked metal-air battery of FIG. 7 may be a metal-air battery apparatus provided by consecutively stacking the unit structure of the metal-air battery 100.

According to the illustrated exemplary embodiment, a metal-air battery in which air may be readily supplied to a gas diffusion layer may be provided. Battery stacking structures may be readily connected to each other by inserting cathode current collectors and anode current collectors between the battery stacking structures.

Also, an internal space of a metal-air battery may be efficiently used, and thus, the metal-air battery having a high capacity with a small volume may be provided. Heat generated from the metal-air battery may be readily dissipated to the outside.

While one or more exemplary embodiments have been described with reference to the figures, it will be understood by those of ordinary skill in the art that various changes in form and details may be made therein without departing from the spirit and scope as defined by the following claims.

What is claimed is:

1. A metal-air battery comprising:
   first and second battery stack structures each comprising an anode, an anode electrolyte layer, a cathode, and a gas diffusion layer;
   a cathode current collector disposed between the first and second battery stack structures and having a non-flat shape;
   a first air supply unit disposed between the cathode current collector and the gas diffusion layer of the first battery stack structure to supply external air to the gas diffusion layer of the first battery stack structure; and
   a second air supply unit disposed between the cathode current collector and the gas diffusion layer of the second battery stack structure to supply external air to the gas diffusion layer of the second battery stack structure,
   wherein the cathodes of the first and second battery stack structures directly face the cathode current collector.

2. The metal-air battery of claim 1, wherein the cathode current collector further comprises first protrusions contacting the gas diffusion layer of the first battery stack structure and protruding in a direction towards the gas diffusion layer of the first battery stack structure.

3. The metal-air battery of claim 2, wherein the cathode current collector further comprises second protrusions contacting the gas diffusion layer of the second battery stack structure and protruding in a direction towards the gas diffusion layer of the second battery stack structure between the first protrusions.

4. The metal-air battery of claim 1, wherein at least one hole is defined through the cathode current collector.

5. The metal-air battery of claim 1, wherein a cross-section of the cathode current collector has one of a wave shape, a rectangular shape, and a trapezoidal shape.

6. The metal-air battery of claim 3, wherein the first battery stack structure and the second battery stack structure each comprise a bent structure by stacking the anode, the anode electrolyte layer, the cathode, and the gas diffusion layer,
   wherein the cathode is separated from a first surface of the gas diffusion layer and contacts a second surface and a third surface of the gas diffusion layer.

7. The metal-air battery of claim 6, wherein the cathode contacts a fourth surface of the gas diffusion layer.

8. The metal-air battery of claim 6, wherein the second and third surfaces of the gas diffusion layer have a relatively larger area than that of the first surface of the gas diffusion layer.

9. A metal-air battery comprising:
   a cathode current collector having a non-flat shape; and
   first and second battery stack structures respectively disposed on both opposite sides of the cathode current collector,
   wherein the cathode current collector contacts gas diffusion layers of the first and second battery stack structures.

10. The metal-air battery of claim 9, wherein a cathode of the first battery stack structure and a cathode of the second battery stack structure face each other.

11. The metal-air battery of claim 9, wherein the cathode current collector further comprises:
   first protrusions contacting the gas diffusion layer of the first battery stack structure and protruding in a direction towards the gas diffusion layer of the first battery stack structure; and
   second protrusions contacting the gas diffusion layer of the second battery stack structure and protruding in a direction towards the gas diffusion layer of the second battery stack structure.

12. The metal-air battery of claim 9, further comprising:
   a first air supply unit disposed between the cathode current collector and the first battery stack structure; and
   a second air supply unit disposed between the cathode current collector and the second battery stack structure.

13. The metal-air battery of claim 9, wherein at least one hole is defined through the cathode current collector.

14. A metal-air battery apparatus comprising:
   a plurality of consecutively stacked metal-air battery unit structures, wherein each of the plurality of consecutively stacked metal-air battery unit structures comprises first and second battery stack structures each comprising a cathode and a gas diffusion layer, a cathode current collector disposed between the first and second battery stack structures and having a non-flat shape, a first air supply unit disposed between the cathode current collector and the gas diffusion layer of the first battery stack structure to supply external air to the gas diffusion layer of the first battery stack structure, and a second air supply unit disposed between the cathode current collector and the gas diffusion layer of the second battery stack structure to supply external air to the gas diffusion layer of the second battery stack structure, and the cathodes of the first and second battery stack structures directly face the cathode current collector; and
   anode current collectors disposed between each of the plurality of consecutively stacked metal-air battery unit structures.

15. The metal-air battery of claim 1, further comprising:
   a cathode tap protruding from the cathode current collector; and
   an anode tap protruding from the anode current collector,
   wherein the cathode tap and the anode taps are disposed on different regions from each other.

16. The metal-air battery of claim 6, wherein the cathode is separated from a fourth surface of the gas diffusion layer.

* * * * *